United States Patent [19]
Tezuka

[11] Patent Number: 5,208,755
[45] Date of Patent: May 4, 1993

[54] SYSTEM FOR CONTROLLING DISTRIBUTION OF TORQUE TO LEFT AND RIGHT WHEELS OF A MOTOR VEHICLE

[75] Inventor: Kazunari Tezuka, Niiza, Japan

[73] Assignee: Fuji Jukogyo Kabushiki Kaisha, Tokyo, Japan

[21] Appl. No.: 563,436

[22] Filed: Aug. 3, 1990

[30] Foreign Application Priority Data

Aug. 31, 1989 [JP] Japan .................................. 1-225250

[51] Int. Cl.$^5$ .......................................... B60K 17/348
[52] U.S. Cl. ................................ 364/426.03; 180/197; 180/248
[58] Field of Search ........... 364/424.05, 424.1, 426.02, 364/426.03, 426.01; 180/197, 247, 248, 249, 233

[56] References Cited

U.S. PATENT DOCUMENTS

| | | | |
|---|---|---|---|
| 4,566,554 | 1/1986 | Suzuki .................................. | 180/249 |
| 4,716,982 | 1/1988 | Ishii et al. .................... | 364/424.05 X |
| 4,941,095 | 7/1990 | Imaseki et al. .................. | 364/424.05 |
| 4,953,654 | 9/1990 | Imaseki et al. ...................... | 180/197 |
| 4,984,649 | 1/1991 | Leiber et al. ........................ | 180/197 |
| 5,005,131 | 4/1991 | Imaseki et al. ................. | 364/426.02 |

FOREIGN PATENT DOCUMENTS 61-132420 6/1986 Japan .

Primary Examiner—Parshotam S. Lall
Assistant Examiner—Collin W. Park
Attorney, Agent, or Firm—Martin A. Farber

[57] ABSTRACT

A differential is provided between a left and a right wheel of a motor vehicle for distributing an output torque of a transmission to the left and right wheels. A fluid operated multiple-disk clutch is provided for restricting the differential operation of the differential. A speed difference between the left and right wheels is calculated. The fluid operated multiple-disk clutch is operated in accordance with the speed difference, in such a manner that the restricting magnitude increases with an increase of the speed difference.

4 Claims, 5 Drawing Sheets

FIG. 1b

SYSTEM FOR CONTROLLING DISTRIBUTION OF TORQUE TO LEFT AND RIGHT WHEELS OF A MOTOR VEHICLE

BACKGROUND OF THE INVENTION

The present invention relates to a control system of torque distribution to the left and right driving wheels of a motor vehicle, and more particularly to a control system in which output torque of a transmission is distributed to the left and right rear driving wheels in accordance with driving conditions of the vehicle.

A differential of the motor vehicle is provided with a differential restricting device such as a fluid operated multiple-disk clutch which operates to lock the differential when one of the left and right wheels slips. Thus, it is possible to drive the vehicle without the vehicle becoming stuck. On the other hand, when the differential is locked, steerability of the vehicle decreases. In order to solve such a problem it has been proposed to change the clutch torque for restricting the differential operation in accordance with slipping states, for example the difference between the speeds of the left and right driving wheels.

However, the change in the clutch torque causes a change in the distribution ratio of the torques to the left and right wheels, thereby affecting the running behavior of the vehicle. Namely, if the clutch torque is zero, the fluid operated clutch is free, so that in the case of a bevel gear differential, a torque TRL transmitted to the left wheel and a torque TRR transmitted to the right wheel are equal (TRL:TRR=50:50) irrespective of a friction coefficient $\mu$ against the road surface. Hence, stable driving is enhanced while maintaining the steerability. On the other hand, as the clutch torque for restricting the differential operation increases, the torques are distributed at a ratio in accordance with a left dynamic weight WTL, a right dynamic weight WTR, a friction coefficient $\mu L$ at the left wheel, and a friction coefficient $\mu R$ at the right wheel as follows.

$$TRL:TRR = WTL \cdot \mu L : WTR \cdot \mu R$$

Accordingly, if the dynamic weight WTL and WTR are equal to each other, a larger torque is distributed to the wheel which runs on the surface having a larger friction coefficient $\mu$. As a result, the vehicle body swings laterally, causing unstable driving as well as a decrease in steerability. Thus, it is necessary to control the torque distribution ratio when driving on a road having a small friction coefficient $\mu$ in dependency on the steering angle and vehicle speed. Moreover, it is necessary to determine the differential operation restricting clutch torque in consideration of the steerability and the driving stability.

Japanese Patent Application Laid-Open 61-132420 discloses a system for controlling the torque distribution where the differential operation restricting clutch torque is increased with increases in the vehicle speed and the steering angle. However, although the slipping of the wheels in a high vehicle speed range can be prevented by locking the differential, the torque distribution deviates to one of the left or right wheels in accordance with the left friction coefficient $\mu L$ and the right friction coefficient $\mu R$. Thus, the driving stability of the vehicle when driven straight-ahead and the steerability at cornering at high speed deteriorate. In addition, at a large steering angle, the differential restriction is slightly affected, thereby decreasing the steerability.

It has been considered to provide a viscous coupling as a device for restricting the differential operation. However, since the viscous coupling has differential restricting characteristics which change with the change of the speed difference between the left and right wheels in a convex curve, a proper restriction effect can not be obtained.

SUMMARY OF THE INVENTION

The object of the present invention is to provide a torque distribution control system for left and right driving wheels where differential operation is properly controlled to ensure steerability and driving stability in accordance with driving conditions.

According to the present invention there is provided a system for controlling a torque distribution to a left wheel and a right wheel of a motor vehicle having a transmission, a differential for distributing an output torque of the transmission to the left and right wheels, and a fluid-operated restricting device for restricting differential operation of the differential.

The system comprises calculator means for calculating a speed difference between speeds of the left wheel and the right wheel, means for determining a restricting torque of the fluid-operated restricting device which increases with an increase of the speed difference and which is a decreasing function of steering angle and vehicles speed, and control means responsive to the restricting torque for operating the fluid-operated restricting device.

In an aspect of the invention, the restricting torque is set to change exponentially with respect to the speed difference.

The other objects and features of this invention will become understood from the following description with reference to the accompanying drawings.

BRIEF DESCRIPTION OF DRAWINGS

FIGS. 1a to 1c show a power transmission system for a four-wheel drive motor vehicle according to the present invention;

DETAILED DESCRIPTION OF THE PREFERRED EMBODIMENT

Figure 1A:
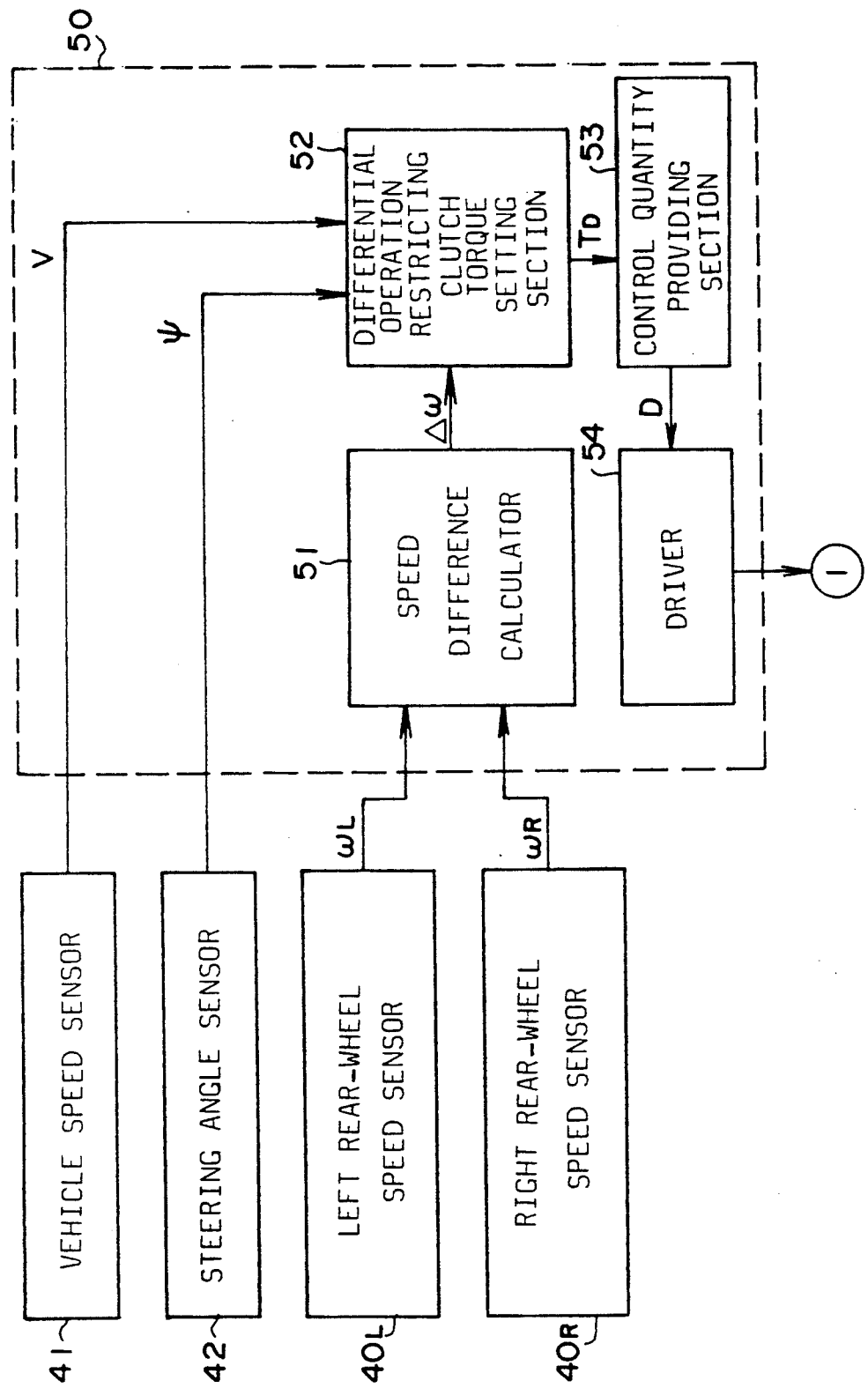
Figure 1B:
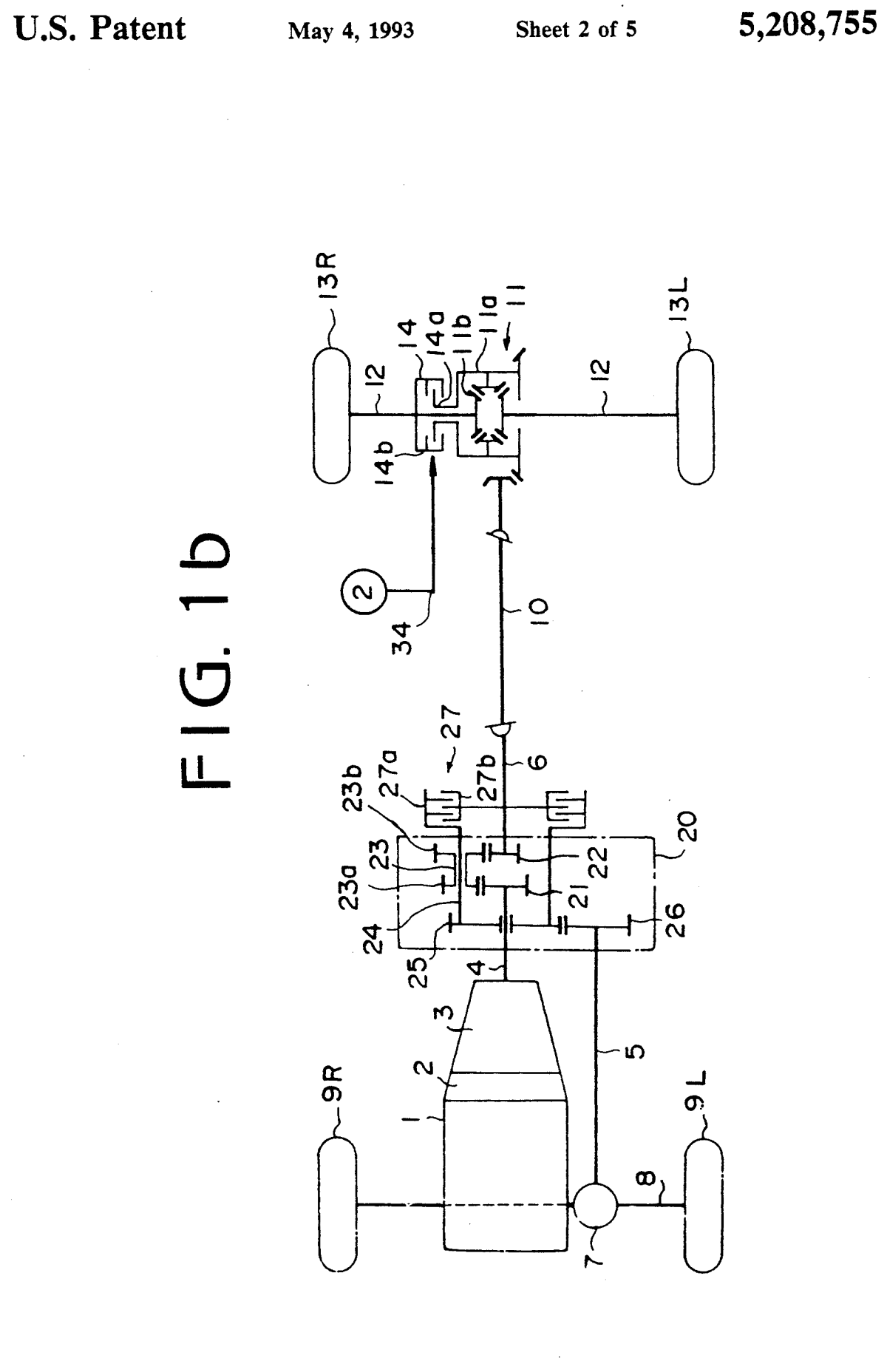
Figure 1C:
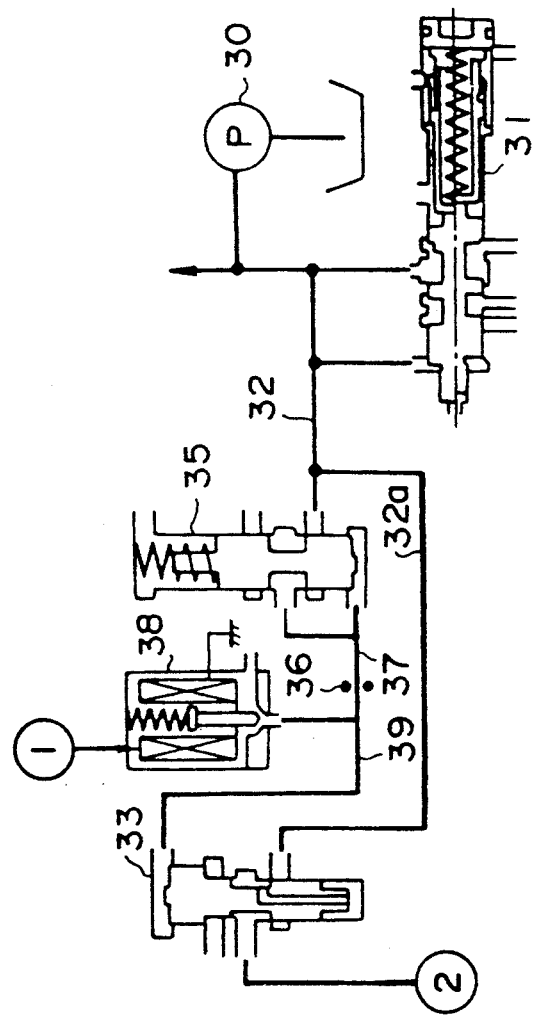

FIGS. 1a to 1c show a power transmission system for a four-wheel drive motor vehicle having a differential according to the present invention. An engine 1 is mounted on a front portion of the vehicle. A clutch 2 and a transmission 3 are disposed at a rear of the engine 1 in a longitudinal direction of the vehicle. An output of the transmission 3 is transmitted to an output shaft 4 which is aligned with a central differential 20. The output shaft 4 is connected to a front drive shaft 5 which is disposed in parallel under the transmission 3 through a pair of reduction gears 25 and 26 of the central differential 20. The front drive shaft 5 is connected to left and right front wheels 9L and 9R through a front differential 7 and axles 8. The output shaft 4 is connected to a rear drive shaft 6 through the central differential 20. The rear drive shaft 6 is connected to the left and right rear wheels 13L and 13R through a propeller shaft 10, a rear axle differential 11 and axles 12.

The central differential 20 is a complex planetary gear device and comprises a first sun gear 21 integrally formed on the output shaft 4, a second sun gear 22 integrally formed on the rear drive shaft 6, and a combined planetary pinion 23 comprising a first planetary pinion 23a meshed with the first sun gear 21, and a second planetary pinion 23b meshed with the second sun gear 22, and supported on a carrier 24. The carrier 24 is connected to the reduction drive gear 25.

Thus, output torque from the output shaft 4 of the transmission 3 is transmitted to the carrier 24 and the second sun gear 22 through the first sun gear 21 and the pinions 23a, 23b at predetermined respective torque distribution ratios. A difference between the rotating speeds of the carrier 24 and the second sun gear 22 is absorbed by rotation of the first and second planetary pinions 23a and 23b.

In the central differential 20, the first sun gear 21 is engaged with the first planetary pinion 23a and the second sun gear 22 is engaged with the second planetary pinion 23b.

Consequently, a standard torque distribution for front torque $T_F$ and rear torque $T_R$ can be set to various values by changing radii of pitch circles of the sun gears 21 and 22 and the pinions 23a and 23b.

Thus, the torque distribution ratio of the front wheels 9L, 9R and the rear wheels 13L, 13R is determined, for example as $$T_F : T_R = 34 : 66$$

A large standard torque can be distributed to the rear wheels 13L, 13R.

A fluid operated multiple-disk friction clutch 27 is provided adjacent the central differential 20 for restricting the differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheels 9L, 9R, thereby changing the distribution of the torque. The carrier 24 is coupled with the second sun gear 22 when the clutch 27 is entirely engaged, thereby locking the central differential 20.

In the vehicle with the front-mounted engine, static weight distribution of front dynamic weight WF and rear dynamic weight WR are determined for example as $$WF : WR = 62 : 38$$

When the clutch is directly engaged, the distribution ratio of the front torque and rear torque is set in accordance with the weight distribution. Thus, the torque distribution is controlled in a range between the standard torque distribution of 34:66 weighed to the rear wheels 13L, 13R and a torque distribution of 62:38, weighted to the front wheels 9L, 9R at complete engagement of the clutch 27 in accordance with the differential operation restricting clutch torque Tc.

The rear axle differential 11 comprises a bevel gear differential device mounted in a differential case 11a. A fluid operated multiple-disk friction clutch 14 is provided adjacent the rear axle differential 11 for restricting the differential operation of the differential 11. The clutch 14 comprises a drive drum 14a secured to the differential case 11a, and a driven drum 14b secured to one of the axles 12 connected to a side gear 11b of the differential 11.

When the clutch 14 is released, the torques are equally distributed to the left and the right wheels 13L and 13R at the ratio of 50:50. When the clutch 14 is engaged, thereby generating a differential operation restricting clutch torque $T_D$, the differential operation of the rear differential 11 is restricted. The torque distribution ratio of the left and right wheels is determined as $$TRL : TRR = WTL \cdot \mu L : WTR \cdot \mu R$$

where WTL and WTR are left and right dynamic weights on the left and right wheels, respectively, and $\mu L$ and $\mu R$ are friction coefficients of the road surface under the respective wheels 9L, 9R, 13L and 13R.

A hydraulic circuit of a control system for the clutch 14 comprises an oil pump 30, a pressure regulator valve 31, a pilot valve 35, a clutch control valve 33 and a solenoid operated duty control valve 38. The regulator valve 31 operates to regulate the pressure of the oil supplied from the oil pump 30 driven by the engine 1 to produce a line pressure, which line pressure is applied to a line pressure conduit 32. The conduit 32 is communicated with a passage 37 through the pilot valve 35. The passage 37 is communicated with the solenoid operated duty control valve 38 downstream of an orifice 36, and with an end of the clutch control valve 33 through a passage 39. The conduit 32 is communicated with the clutch control valve 33 through a passage 32a. The clutch control valve 33 is communicated with the clutch 14 through a passage 34. The solenoid operated valve 38 is operated by pulses from a control unit 50 at a duty ratio determined therein, thereby controlling draining of the oil to provide a control pressure. The control pressure is applied to the clutch control valve 33 to control the oil supplied to the clutch 14 so as to control the clutch pressure (torque) and hence the differential operation restricting clutch torque $T_D$.

The fluid operated multiple-disk clutch 27 of the central differential 20 is operated through a hydraulic circuit (not shown) similar to the rear axle differential 11 so as to control the differential operation restricting clutch torque Tc.

The control unit 50 is supplied with output signals from a left rear-wheel speed sensor 40L, a right rear-wheel speed sensor 40R, a vehicle speed sensor 41 and a steering angle sensor 42. The control unit 50 has a speed difference calculator 51 to which a left rear-wheel speed $\omega L$ and a right rear-wheel speed $\omega R$ from the sensors 40L and 40R are applied. In the speed difference calculator 51, a difference $\Delta\omega$ between the speed $\omega L$ and $\omega R$ is calculated as, $\Delta\omega = |\omega R - \omega L|$. The difference $\Delta\omega$ is applied to a differential operation restricting clutch torque setting section 52. In accordance with the input signal, the clutch torque setting section 52 retrieves a clutch torque $T_D$ from a look-up table.

Figure 2A:
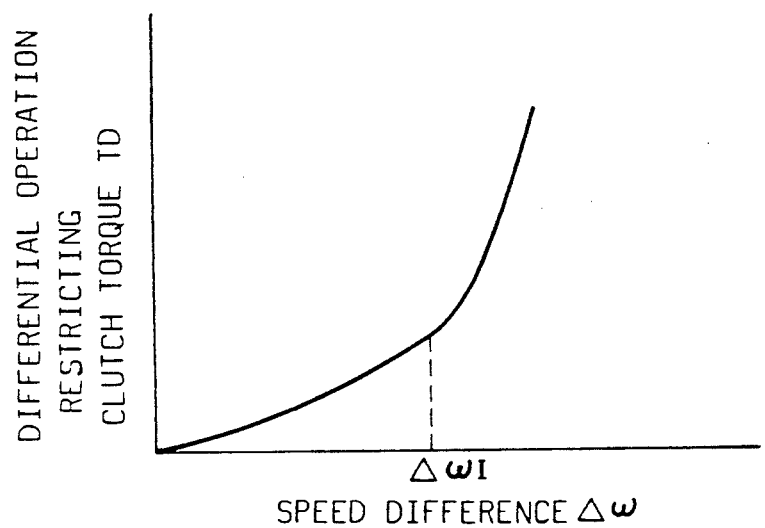
FIG. 2a is a graph showing characteristics of differential operation restricting clutch torque in accordance with a speed difference.

The effective diameters of the left and right wheels 13L and 13R may not be quite the same, and the friction coefficient $\mu L$ at the left wheel 13L may slightly differ from the friction coefficient $\mu R$ at the right wheel 13R, even on a dry road surface. Thus, the speed difference $\Delta\omega$ is apt to increase, particularly in a high vehicle speed range. Hence, the clutch torque $T_D$ stored in the look-up table is set as an exponential function of the speed difference $\Delta\omega$ which varies like an exponential curve as shown in FIG. 2a. More particularly, when the speed difference $\Delta\omega$ is small, the clutch torque $T_D$ is also small. As the speed difference $\Delta\omega$ increases, the clutch torque $T_D$ greatly increases so as to sufficiently restrict the differential operation.

Figure 2B:
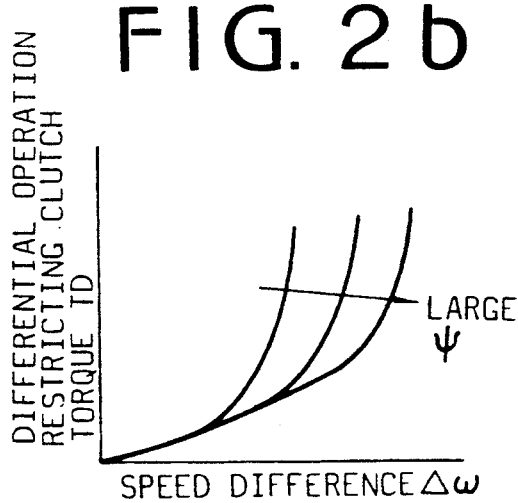
FIGS. 2b and 2c are graphs showing characteristics of differential operation restricting clutch torque corrected in accordance with steering angle and vehicle speed, respectively.
Figure 2C:
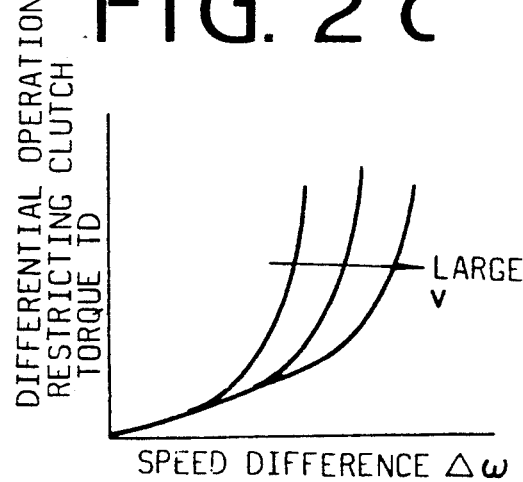

A vehicle speed V from the vehicle speed sensor 41 and a steering angle $\Psi$ from the steering sensor 42 are further fed to the differential operation restricting clutch torque setting section 52 to correct the clutch torque $T_D$. As shown in FIG. 2b, the clutch torque $T_D$ decreases with an increase of the steering angle $\Psi$ at the same speed difference $\Delta\omega$, thereby increasing steerability. The clutch torque $T_D$ also decreases with an increase of the vehicle speed V at the same speed difference $\Delta\omega$ as shown in FIG. 2c, thereby decreasing the difference between the torques distributed to the left and right wheels to ensure stable driving.

The clutch torque $T_D$ is applied to a control quantity providing section 53 where a duty ratio D corresponding to the clutch torque $T_D$ is provided. The duty ratio D provided at the section 53 is applied to the solenoid operated duty control valve 38 through a driver 54.

Figure 3:
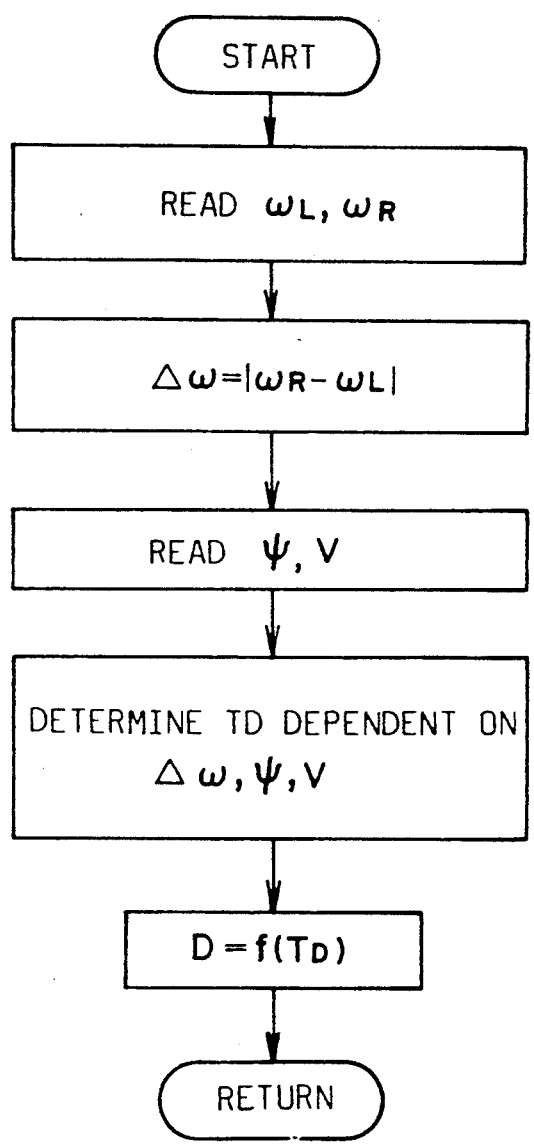
FIG. 3 is a flowchart showing an operation of a control unit in the system.

The operation of the system will be described hereinafter with reference to the flowchart of FIG. 3. The power of the engine 1 is transmitted to the transmission 3 through the clutch 2 at which the transmission ratio is controlled. The output of the transmission 3 is transmitted to the first sun gear 21 of the central differential 20. The front torque $T_F$ and the rear torque $T_R$ are determined in accordance with the radii of the gears of the central differential 20 and the clutch torque Tc of the clutch 27 to distribute a larger torque to the rear wheels 13L, 13R than to the front wheels 9L, 9R. The torque is transmitted to the front wheels 9L and 9R through the carrier 24, the reduction drive gear 25, the reduction driven gear 26, the front drive shaft 5 and the front differential 7. The torque is transmitted to the rear wheels 13L, 13R through the second sun gear 22, the rear drive shaft 6, the propeller shaft 10 and the rear differential 11.

The left rear-wheel speed $\omega L$ and the right rear-wheel speed $\omega R$ are detected by the left rear-wheel speed sensor 40L and the right-wheel speed sensor 40R. The speed difference $\Delta\omega$ is calculated in the speed difference calculator 51.

When the calculated difference is small due to the friction coefficient $\mu$ of the road and the difference between effective wheel diameters of the left and the right rear-wheels, a small clutch torque $T_D$ is determined as shown in FIG. 2a. A signal corresponding to a large duty ratio is applied to the solenoid operated duty control valve 38. Thus, the clutch control pressure becomes zero and the clutch control valve 33 operates to close the passage 32a, thereby draining the oil from the clutch 14. The clutch 14 is disengaged and the clutch torque becomes zero so as to render the rear differential 11 free. Accordingly, the torque is equally transmitted to the left rear-wheel 13L and the right rear-wheel 13R, thereby improving steerability and driving stability.

If the vehicle is driven on a slippery road and one of the left or right rear-wheels 13L, 13R slips due to the difference between the friction coefficients $\mu L$ and $\mu R$ at the left and the right wheels, the speed difference $\Delta\omega$ becomes large. Thus, a large clutch torque $T_D$ is set so that a small duty ratio D is applied to the solenoid operated valve 38. The clutch control pressure increases to operate the clutch valve 33, thereby opening the passage 32a. The clutch 14 is thus supplied with the oil so that the clutch torque increases so as to restrict the differential operation of the rear differential 11. Consequently, the slipping is suppressed, thereby preventing the vehicle from becoming stuck. Thus, the running performance of the vehicle is improved.

When the steering angle $\Psi$ increases at cornering, the clutch torque $T_D$ is decreased so that good steerability is ensured. In a high vehicle speed range, the clutch torque is similarly decreased with an increase of the vehicle speed V so that the torques are equally distributed to the left and right rear-wheels 13L, 13R, irrespective of the difference between the left and right friction coefficients $\mu L$ and $\mu R$. Therefore, although the wheels may slightly slip, the swinging of the vehicle body is prevented, so that the vehicle is stably driven in straight-ahead driving.

Although one embodiment of the present invention is described above, the present invention may be applied to a two-wheel drive vehicle and four-wheel drive vehicles other than the described four-wheel drive vehicle.

In accordance with the present invention, the differential operation restricting clutch torque for controlling the torque distribution to the left and right rear-wheels is controlled with characteristics of an exponential function with respect to the difference between the two wheels to effectively restrict the differential operation at the slipping of the wheels. The clutch torque is further determined as a decreasing function of the vehicle speed and the steering angle, thereby enhancing stability at high vehicle speed and steerability on slippery roads.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling a torque distribution to a left and a right wheel of a motor vehicle having a transmission, a differential for distributing an output torque of the transmission to said left and right wheels, and a fluid-operated restricting device for restricting a differential operation of said differential, the system comprising:
    calculator means for calculating a speed difference between speeds of said left and said right wheels;
    means for setting a restricting torque of said fluid-operated restricting device which increases with an increase of said speed difference and decreases with an increase in steering angle and with an increase in vehicle speed and for producing a restricting torque signal; and
    control means responsive to said restricting torque signal for operating said fluid-operated restricting device.

2. The system according to claim 1, wherein said restricting torque is set to change exponentially with respect to said speed difference.

3. The system according to claim 1, wherein said fluid-operated restricting device is a fluid operated multiple-disk friction clutch.

4. A system for controlling a torque distribution to left and right wheels of a motor vehicle having a transmission, a differential for distributing an output torque of the transmission to the left and right wheels, vehicle speed sensing means for sensing vehicle speed and for producing a vehicle speed signal, wheel speed sensing means for sensing speed of the left and right wheels respectively and for producing left and right wheel speed signals, steering angle sensing means for sensing steering angle and for producing a steering angle signal, and a fluid-operated restricting device for restricting differential operation of the differential, the system comprising:

calculator means responsive to the left and right wheel speed signals for calculating speed difference between the speeds of the left and right wheels and for producing a speed difference signal;

first memory means for storing a first exponential function representing a first restricting torque increasing with said speed difference increasing and decreasing with the steering angle increasing;

second memory means for storing a second exponential function representing a second restricting torque increasing with said speed difference increasing and decreasing with the vehicle speed increasing;

first restricting torque setting means responsive to said speed difference signal and the steering angle signal for retrieving said first restricting torque from said first memory means and for producing a first restricting torque signal;

second restricting torque setting means responsive to said speed difference signal and the vehicle speed signal for retrieving said second restricting torque from said second memory means and for producing a second restricting torque signal;

torque setting means responsive to said first restricting torque signal and said second restricting torque signal for setting a restricting torque and for producing a restricting torque signal; and control means responsive to said restricting torque signal for operating the fluid-operated restricting device.

* * * * *